United States Patent [19]

Reisfeld et al.

[11] Patent Number: 6,022,592
[45] Date of Patent: Feb. 8, 2000

[54] PROCESS FOR PREPARING A SOLID STATE DYE LASER

[75] Inventors: Renata Reisfeld; Eli Yariv, both of Jerusalem, Israel

[73] Assignee: Yissum Research Development Company of the Hebrew University of Jerusalem, Jerusalem, Israel

[21] Appl. No.: 09/118,916

[22] Filed: Jul. 20, 1998

[51] Int. Cl.[7] ..................................................... B05D 3/02
[52] U.S. Cl. ................................ 427/379; 427/387; 8/523
[58] Field of Search ................................ 8/523; 427/379, 427/387

[56] References Cited

FOREIGN PATENT DOCUMENTS

95/15021  6/1995  WIPO .

OTHER PUBLICATIONS

Rahn et al, Appl. Opt. 34(36), pp. 8260–71, 1995.
Rahn et al, Appl. Opt. 36(24), pp. 5862–5871, 1997.
"Advances in Dye–Doped Sol–Gel Lasers" by Dunn et al, Mat. Res. Soc. Symp. Proc., vol. 329, 1994.
"High–Efficiency Pyrromethene Doped Solid–State Dye Lasers" by Hermes et al, Appl. Phys. Lett. 63, 1993.
"Solid State Dye Laser" by Moreshead et al, SPIE Sol–gel Opt. III, 1994.
"Laser Performance and Material Properties of a High Temperature Plastic Doped with Pyrromethene–$BF_2$ Dyes" by Allik et al, Mat. Res. Soc. Symp. Proc. vol. 329, 1994.
"Photostability and Loss Mechanism of Solid–State Red Perylimide Dye Lasers" by Reisfeld et al, Journal of Sol–Gel Science and Technology, 1995.
"Perylene, Pyrromethene and Grafted Rhodamine Doped Xerogels for Tunable Solid State Laser" by Canva et al, SPIE Sol–gel Opt. III 2288, 1994.
"Perylene–and Pyrromethene–Doped Xerogel for a Pulsed Laser" by Canva et al, Applied Optics, vol. 34, No. 3, 1995.
"Synchronously Pumped Visible Laser Dye with Twice the Efficiency of Rhodamine 6G" by O'Neil, 1993 Optical Society of America.
"Solid–State Tunable Lasers Based on Dye–Doped Sol–gel Materials" by Dunn et al, SPIE vol. 1328, 1990.
"New High–Efficiency Pyrromethene–580 Doped Modified PMMA Solid–State Dye Laser" by Kravchenko et al, SPIE vol. 2986, 1996.
"New Developments in Solid State Lasers" by Reisfeld et al, Opt. Mat. 1997.
Lasers Based on Dye Doped Sol–gel Composite Glasses, by Rahn et al, SPIE Opt. III 2288 1994.
"Lasers Based on Sol–gel Technology" by Reisfeld, Optical and Electronic Phenomena in Sol–Gel Glasses and Modern Application, Structure and Bonding, vol. 85, 1996.
"Sol–gel Silica Laser Tunable in the Blue" by Lam et al, Appl. Opt. 34, 1995.
"Improved Sol–gel Materials For Efficient Solid State Dye Lasers" by Canva et al, New Materials for Advanced Solid State Lasers, 1994.

Primary Examiner—Erma Cameron
Attorney, Agent, or Firm—Sughrue, Mion, Zinn, MacPeak & Seas, PLLC

[57] ABSTRACT

The invention provides a process for preparing a solid state dye laser in a composite glass matrix, without the use of polymerization initiators, comprising preparing a porous silica gel, effecting thermal treatment thereof at a temperature of at least 500° C. to produce a glass with improved mechanical properties, impregnating a solid state laser dye dissolved in methylmethacrylate into the silicon gel glass in a closed container and effecting heat polymerization of the methylmethacrylate at a temperature of at least 60° C., whereby there is formed a glass having pores impregnated with a solid state laser dye and polymethylmethacrylate.

6 Claims, 6 Drawing Sheets

Molecular structure of pyrromethene dyes

PM 567
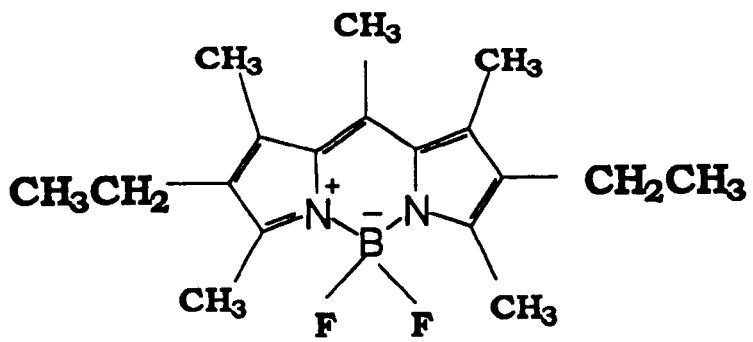
PM 580
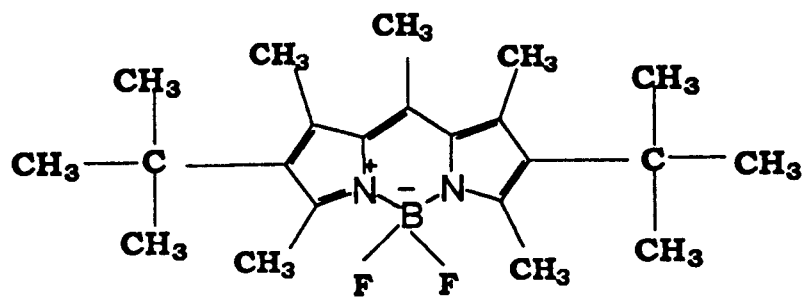
PM 597
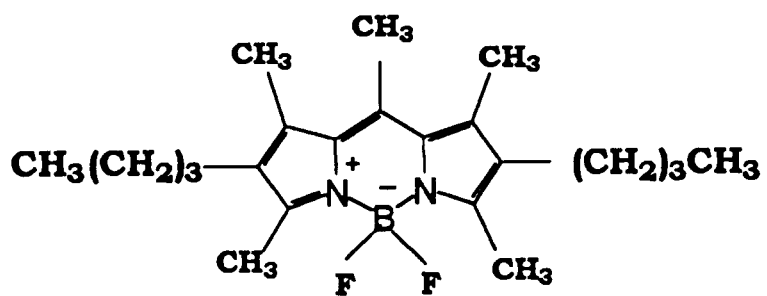
Fig. 1. Molecular structure of pyrromethene dyes

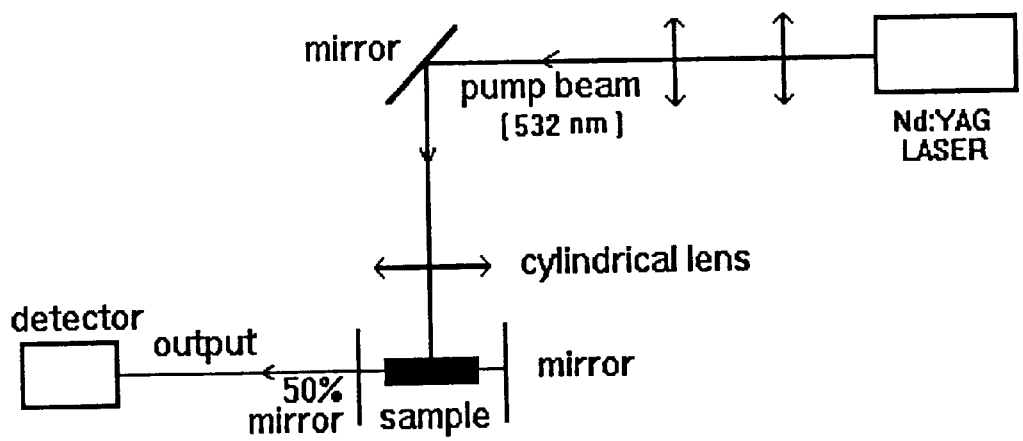
Fig. 2. Experimental setup for laser measurements

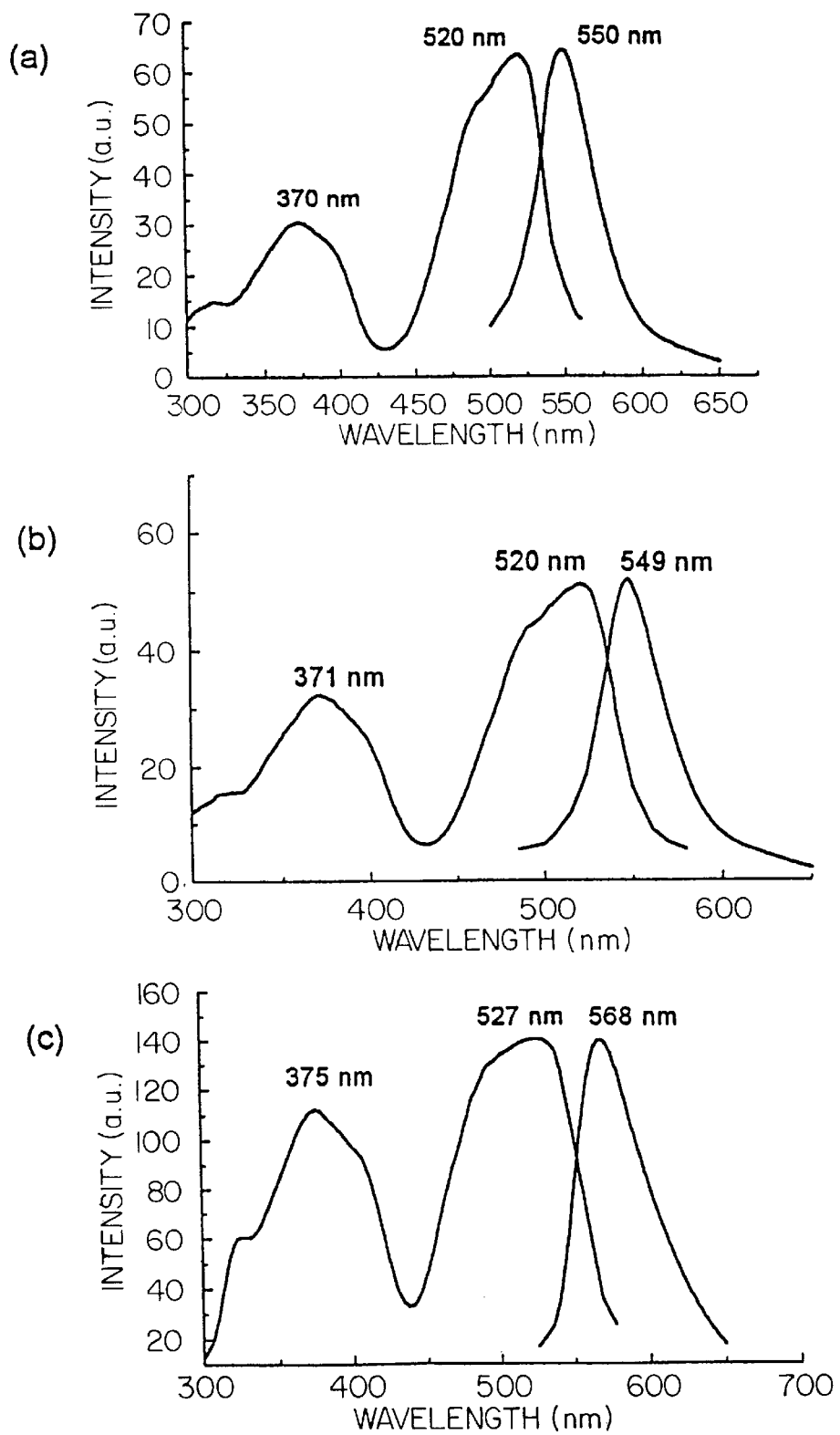
Fig. 3. Excitation and emission spectra of samples: (a) PM 567/ORMOSIL, (b) PM 580/composite glass, (c) PM 597/ORMOSIL.

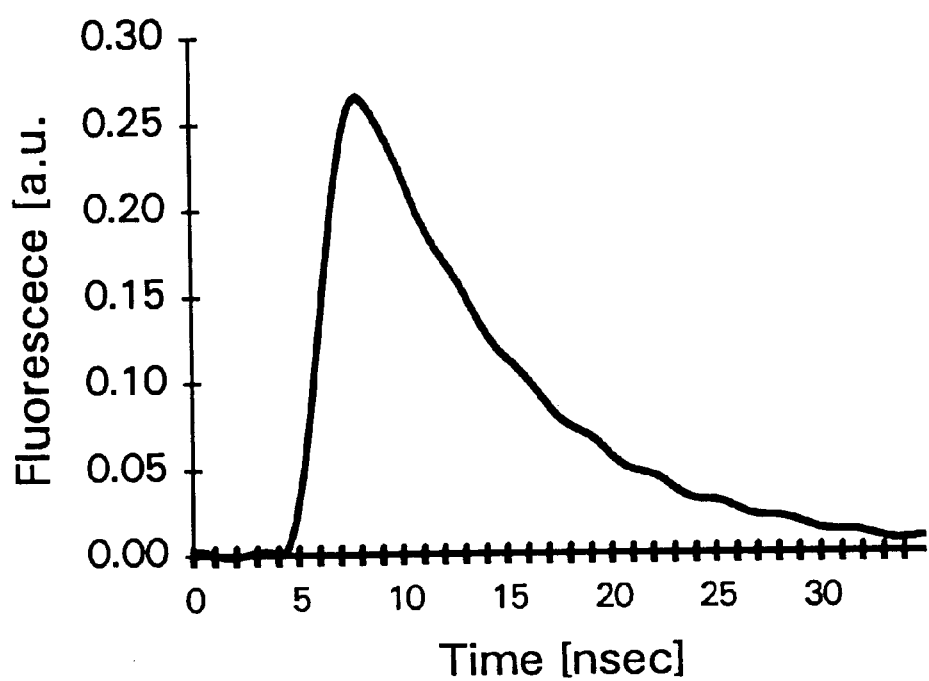
Fig. 4. Fluorescence lifetime curve of PM 597/composite glass.

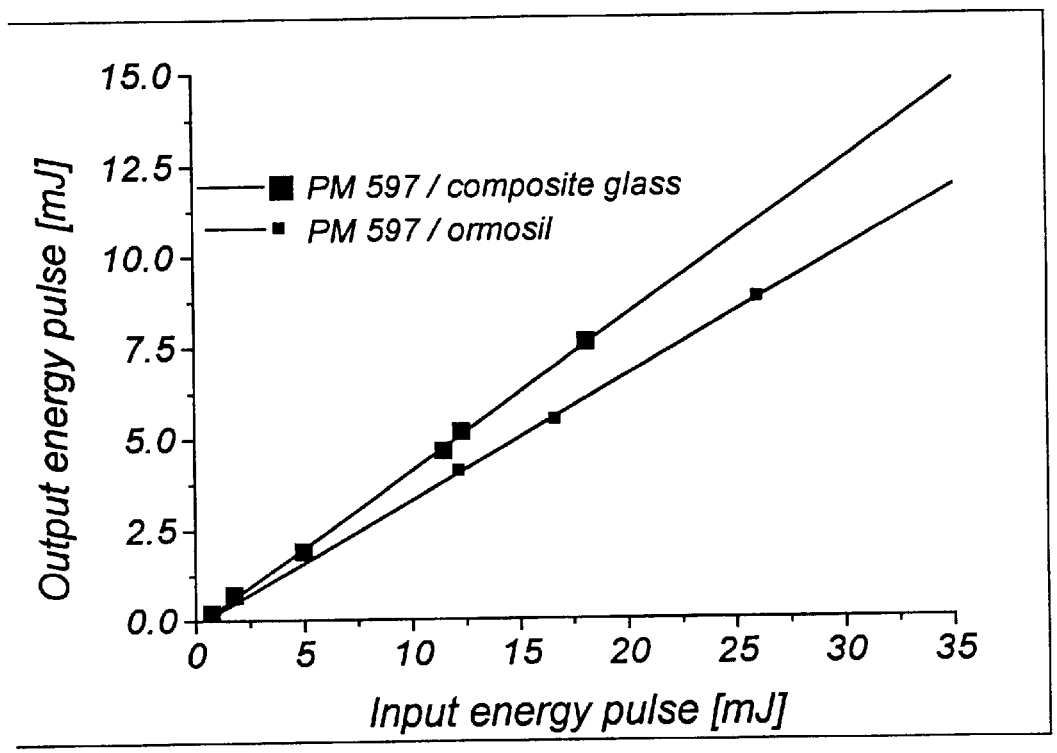
Fig. 5. Laser efficiency of PM 597 samples.

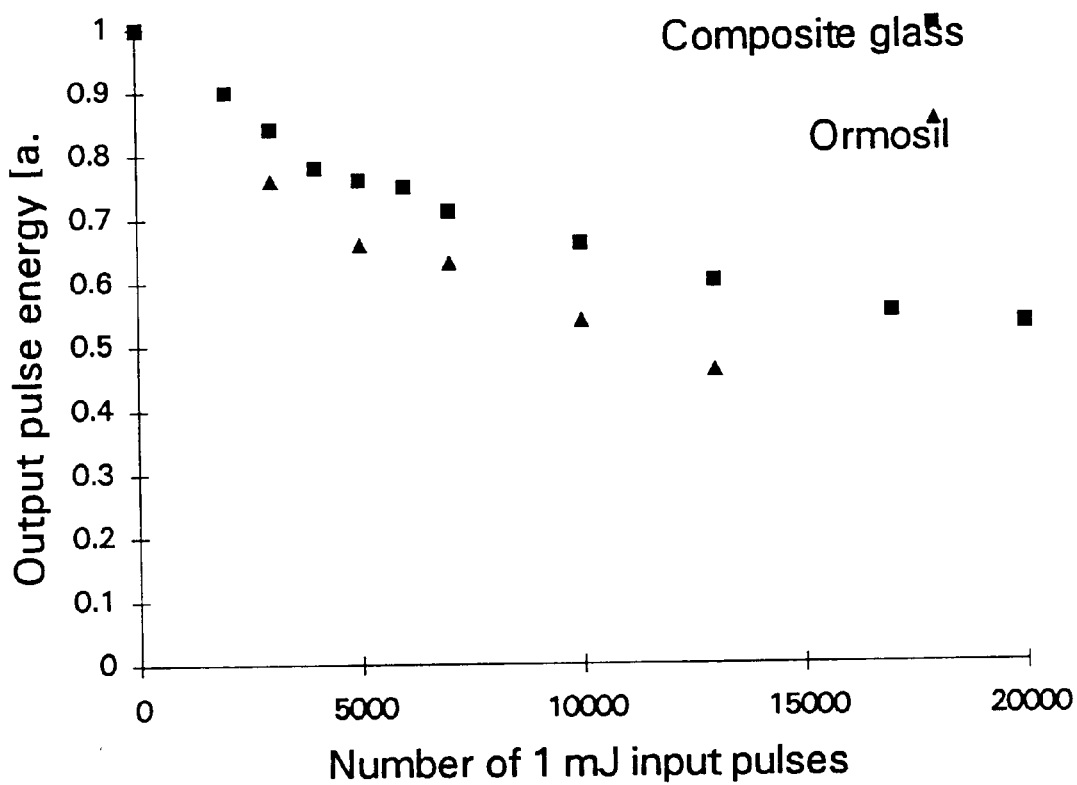
Fig. 6. Longevity of PM 597 samples.

PROCESS FOR PREPARING A SOLID STATE DYE LASER

BACKGROUND OF THE INVENTION

The present invention relates to a process for preparing a solid state dye laser. More particularly, the present invention relates to a process for preparing a solid state dye laser in a composite glass matrix.

In the last years, an intensive effort have been devoted to obtain solid-state dye laser devices that could replace liquid dye lasers, as described e.g. in R. Reisfeld, Laser based on sol-gel technology, in: R. Reisfeld, C. K. Jorgensen (Eds.), Optical and Electronic Phenomena in Sol-Gel glasses and Modern Application, Structure and Bonding, vol. 85, Springer, 1996, pp. 215–233.

Being compact, non toxic, non volatile, non flammable and mechanically stable, solid-state dye lasers have advantages over liquid dye lasers. Attempts have been made to use polymers as hosts for organic dyes in order to fabricate solid-state dye lasers, but these hosts have been shown to be lacking in mechanical and thermal properties and refractive index uniformity (see, e.g. B. Dunn, J. D. Mackenzie, J. I. Zink, O. M. Stafsudd, SPIE vol. 1328 Sol-Gel Optics (1990) 174).

Sol-gel glass offers a host in which organic dyes can be impregnated into a solid medium. The sol-gel technique is based on hydrolysis and polycondensation reactions of organometallic compounds. In the present case, room temperature reactions of silicon alkoxide $Si(OR)_4$ according to the steps:

hydrolysis: $Si(OR)_4 + 4H_2O \rightarrow Si(OH)_4 + 4ROH$ polycondensation: $nSi(OH)_4 \rightarrow (SiO_2)_n + 2nH_2O$ The result is a cross-linked three dimensional polymer. Generally, tetraethoxysilane, $Si(OC_2H_5)_4$ (TEOS) or tetramethoxysilane, $Si(OCH_3)_4$ (TMOS) are used as silicon alkoxides. It is common to include an alcoholic or another solvent in the starting mixture and the hydrolysis is generally catalyzed by an acid. Sol particles are produced, condensed and become wet gel and then dry gel. In the last step the gel is condensed and become glass. The porosity of the glass is an important factor and it is controlled by the way of preparation. Quantities and types of catalysts, composition of the starting mixture and temperature of stirring, aging and drying are the parameters which determine the glass porosity.

However, porous glasses are not convenient as laser supporting matrices due to their fragility and due to the low photostability of the dyes when doped in these glasses. In order to fill the pores, incorporation of organic chains is needed. This is currently done in one of two ways: (1) impregnation of an organic polymer (or monomer which becomes polymer after polymerization) in the porous glass. By this way one can obtain composite glasses. (2) Use of a silicon alkoxide compound in which, one of the 4 ethoxy groups of TEOS or methoxy groups of TMOS is replaced by another organic group. This compound can be used as unique alkoxide in the mixture or together with TEOS or TMOS, leading to organically modified silicate (ormosil) glass samples. Compounds like 3-(trimethoxysilyl) propylmethacrylate $C_7H_8O_2$—Si—$(OCH_3)_3$ (TMSPMA), methyl-triethoxysilane (MTEOS), 3-glycidoxypropyltrimethoxysilane (GLYMO), methyltrimethoxysilane (MTMOS) and vinyltriethoxysilane (VTEOS) are used for this purpose.

In R. Reisfeld, E. Yariv, H. Minti, Opt. Mater. 8 (1997) 31, the present inventors have reported on composite glasses and ormosils doped with perylimide dyes and pyrromethene (PM) 567. We found sensitivity of PM 567 to acidic surrounding, leading to loss of the lasing ability at pH<3 by irreversible process.

Interest in many pyrromethene dyes has been growing due to their high efficiency.

Solid state laser samples doped with pyrromethene dyes, have been investigated, by ormosil, xerogel or sol gel matrices, as reported by B. Dunn, F. Nishida, R. Toda, J. I. Zink, T. H. Allik, S. Chandra, J. A. Hutchinson, Mater. Res. Soc. Symp. Proc. 329 (1994) 267; M. Canva, A. Dubois, P. Georges, A. Brun, F. Chaput, A. Ranger, J.-P. Boilot, SPIE Sol-gel Opt. III 2288 (1994) 298; M. Canva, P. Georges, J. F. Perelgritz, A. Brun, F. Chaput, J.-P. Boilot, Appl. Opt. 34 (1995) 428; M. D. Rahn and T. A. King, SPIE Sol-gel Opt. III 2288 (1994) 382.

Similarly, R. E. Hermes, T. H. Allik, S. Chandra, J. A. Hutchinson, Appl. Phys. Lett. 63 (1993) 877 and Y. V. Kravchenko, A. A. Manenkov, G. A. Matushin, V. M. Mizin, D. P. Pacheco, H. R. Aldag, SPIE Vol. 2986 (1996) 124 report modified polymer matrices using longitudinal pumping system.

Pyrromethene (PM) dyes are high efficiency laser dyes. Heretofore, however, it has not been possible to utilize said dyes in composite glass, which is usually made by impregnation and polymerization of methacrylate (MMA) in silica gel, since polymerization is initiated by benzoil peroxide, which causes damage to PM molecules, and decreases their efficiency.

According to the present invention there has now been developed a procedure by which dyes which are sensitive to polymerization initiators such as PM dyes, can be doped into composite glass, thus leading to high quality, solid state dye lasers.

More specifically, according to the present invention there is now provided a process for preparing a solid state dye laser in a composite glass matrix, without the use of polymerization initiators, comprising:

a) preparing a porous silica gel;

b) effecting thermal treatment thereof at a temperature of at least 500° C. to produce a glass with improved mechanical properties;

c) impregnating a solid state laser dye dissolved in methylmethacrylate into said silicon gel glass in a closed container; and d) effecting heat polymerization of said methylmethacrylate at a temperature of at least 60° C., whereby there is formed a glass having pores impregnated with a solid state laser dye and polymethylmethacrylate.

In especially preferred embodiments of the present invention said dye is a pyrromethene dye.

Preferably said heat polymerization is carried out in a closed container for a period of at least 5 days at a temperature of at least 63° C. and there is formed a final product having a density of between 1.4 and 1.5 $gm/cm^3$.

In especially preferred embodiments of the present invention there is formed a final product emitting light pulses at 560–575 nm and having a laser slope efficiency of about 42%.

While the invention will now be described in connection with certain preferred embodiments in the following examples and with reference to the accompanying figures so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

BRIEF DESCRIPTION OF THE DRAWINGS

In the drawings:

FIG. 1 presents the chemical structure of dye molecules PM 567, PM 580 and PM 597;

FIG. 2 is a schematic representation of the experimental set-up for laser measurements utilized in the examples hereinafter;

FIG. 3 is a graphic presentation of excitation and emission spectra of the dyes in ormosil and in composite glass;

FIG. 4 is a graphic presentation of fluorescence lifetime;

FIG. 5 is a graphic presentation of laser efficiency; and

FIG. 6 is a graphic representation of longevity.

DETAILED DESCRIPTION OF THE INVENTION

EXAMPLES

Samples Preparation

The laser samples prepared for testing are divided into two groups: 1) Composite glass and 2) Ormosil glass. The composite glasses were prepared by a two-step process. First, porous silica gel samples were prepared by stirring a solution of Tetraethoxysilane (TEOS) as silicon alkoxide, ethanol as solvent, water and HCl acid, as hydrolysis catalyst, at molar ratio of 1:6:6:0.05. After about 30 minutes, in which the exothermic hydrolysis was completed, a small amount (few drops for each 50 ml of solution) of HF was added to the solution causing increased reaction rate of polycondensation. The amount of HF is essential as a factor that determines the porosity of the silica gel bulks, since high reaction rate of the polycondensation leads to high porosity. After few minutes the solution was placed into polyethylene containers and was dried for 6 weeks at 45° C. or 10 weeks at room temperature. During this period the solution had became solid bulk samples. To complete the thermal treatment, the samples were heated for 2 weeks at 80° C.and then, slowly, the heat was increased in average rate of 0.5° C. per minute up to 600° C. After this stage the samples were strong enough for the second step of preparation in which the porous glasses were introduced into pyrromethene dye/methylmethacrylate, $CH_2C(CH_3)COOCH_3$ (MMA) solution in glass containers, hermetically closed. A week at 65° C. was needed to complete polymerization of MMA. It has to be noted that polymerization initiators were not used for the polymerization since we found previously that these pyrromethene dyes are damaged by the initiator. Samples of glass impregnated with dye/polymethylmethacrylate (PMMA) were obtained after breaking the glass containers, and polishing. These samples are characterized by high transparency, good mechanical properties and a density of about 1.44 $g/cm^3$. By this method, samples doped with PM 580 and PM 597 were prepared.

The ormosil samples were prepared by one step process. A solution of TEOS or TMOS, TMSPMA, water and HCl acid in molar ratio of 1:1:3.5:0.04 was stirred about one hour to complete hydrolysis. Since it was found that pyrromethene dyes lose their lasing ability at acidic surrounding, some drops of pyridine were added to the solution in order to decrease the acidity up to pH>4. After this, pyrromethene dye solved in methylmethacrylate $CH_2C(CH_3)COOCH_3$ (MMA) was added to the solution (1 mole of MMA for 1 mole of TEOS or TMOS). The solution was stirred for 30 minutes and was placed into polyethylene containers at 45° C. The solution was gelled, aged and dried during 6 weeks and became solid samples. Finally the samples were polished. The density of these samples was about 1.25 $g/cm^3$.

Measurements

For the laser measurements, transversally pumped dye laser system was built. The pump ray is the second harmonic generation of Nd:YAG laser ("Lumonics HY600"), emitting 8 nsec pulses at 532 nm. By using a cylindrical lens, there was obtained a pump ray which has approximately 5 mm of width and 1 mm of thickness. The dye laser cavity consists of two plane parallel mirrors 7.5 cm apart, one a 50% broadband reflector. The energy of output and input pulses were measured by "Ophir Laserstar" detector. Every value was taken by averaging energy values of more than 20 pulses. The experimental setup is presented in FIG. 2.

The majority of the reported results have been obtained by longitudinal pumping system and this might be essential for the results.

Excitation-emission spectra were obtained by "Jasco FP 750" spectrofluorimeter.

Lifetime fluorescence of the samples were measured using "Megaplus" nitrogen laser ("Laser Photonics") as exciting 337 nm short pulses source. The pulselength was 1.5 nsec at repetition rate of 20 Hz. The fluorescence was detected by a 818-BB-20 photodetector ("Newport") and its life curve was presented by TDS 620A scope ("Tektronix"). In order to obtain a "real" fluorescence curve and lifetime, a deconvolution program which could minimize the effect of the exciting pulselength was used.

Results

Spectral Properties

The excitation and emission spectra of the dyes in ormosil (PM 567 and PM 597) and in composite glass (PM 580) are given in FIG. 3. The spectra of PM 580 in ormosil and PM 597 in composite glass were also measured. There was no difference between the spectra of each dye in the two different kinds of matrices. From FIG. 3 the similarity between the spectral properties of PM 567 and PM 580 can easily be seen. Each dye has an excitation peak in the UV range. The main excitation peak is at 520 nm (for PM 567 and PM 580) or 527 nm (PM 597). The shoulder near the peak is attributed to dimerization and aggregation of the dye molecules.

Fluorescence Lifetime

A representative fluorescence decay graph is given in FIG. 4. The results of these measurements are summarized in table 1. There appears to be no distinction between the fluorescence lifetime in ormosil samples compared with composite glass samples, but one can conclude that fluorescence lifetime of PM 567 is slightly higher than the fluorescence lifetime of PM 580 and PM 597. The fluorescence lifetime of PM 567 in ormosil (8.1 nsec) is higher then its fluorescence lifetime in liquid solutions, which is between 6 and 7 nsec (see Y. Asor, Z. Burshtein" Spectroscopy and laser characteristics of copper vapor laser pumped pyrromethene 556 and pyrromethene 567 dye solutions", Spanish-Israeli workshop on solid state lasers, Dec. 14–21, 1997, Ein Gedi, Israel).

TABLE 1

Lifetime fluorescence of samples

| Dye | Matrix | Dye concentration* | Lifetime fluorescence |
| --- | --- | --- | --- |
| PM 567 | ormosil | $7 \times 10^{-4}$ M | 8.1 nsec |
| PM 580 | ormosil | $5 \times 10^{-4}$ M | 7.2 nsec |
| PM 580 | composite | $5 \times 10^{-4}$ M | 7.1 nsec |
| PM 597 | ormosil | $5 \times 10^{-4}$ M | 7.0 nsec |
| PM 597 | composite | $5 \times 10^{-4}$ M | 7.2 nsec |

*Dye concentration in the initial solution

Slope Efficiency

Quite high efficiencies were obtained for all the investigated samples, since all the samples were doped with dye at concentrations which were chosen to be closed to the optimal concentration. However, the most impressive result was obtained for PM 597/composite glass with 42%. In the second place PM 597/ormosil with 35%. There was no significant difference between the efficiencies of PM 567 and PM 580. A possible explanation for these results is that PM 597 has its excitation peak at 527 nm which is closer to the pump wavelength (532 nm) than the excitation peaks of the other dyes (520 nm). The results are summarized in table 2. A methodical optimization of the dye concentration might to lead improved efficiencies for such samples.

In order to compare the present solid samples with liquid pyrromethene lasers, slope efficiencies of pyrromethene dye/ethanol solutions at similar optical density, were measured. The results, which are given in table 3, show that for PM 597 the efficiency in solid matrix is not much less than in ethanol.

TABLE 2

Slope efficiencies of laser samples

| Dye | Matrix | Dye concentration* | Slope efficiency |
| --- | --- | --- | --- |
| PM 567 | ormosil | $7 \times 10^{-4}$ M | 32% |
| PM 580 | ormosil | $5 \times 10^{-4}$ M | 28% |
| PM 580 | composite | $5 \times 10^{-4}$ M | 23% |
| PM 597 | ormosil | $5 \times 10^{-4}$ M | 35% |
| PM 597 | composite | $5 \times 10^{-4}$ M | 42% |

*Dye concentration in the initial solution

TABLE 3

Slope efficiencies of laser dyes in solutions (Ethanol)

| Dye | Dye concentration | Slope efficiency |
| --- | --- | --- |
| PM 567 | $9 \times 10^{-4}$ M | 51% |
| PM 597 | $8 \times 10^{-4}$ M | 47.6% |
| PM 580 | $8 \times 10^{-4}$ M | 50.4% |

A similarity of the results obtained in solid samples and liquids is proof of a good optical quality of the samples.

Photostability

In order to investigate the photostability of the laser sample, the output energy pulse of the sample after the sample had been pumped by numerous pulses of constant energy, emitted by Nd:YAG laser (the second harmonic generation) was measured. The efficiency decays exponentially with the increasing number of input pulses as a result of a photodegradation of the dye molecules caused by the pump pulses. The results for PM 597 samples are given graphically in FIG. 6. In this measurement the samples were pumped by 1 mJ (20 mJ/cm$^2$) pulses. The efficiency of PM 597/composite glass sample decreased to 50% from its initial value (half life longevity) after 22,000 pump pulses. The half life longevity for PM 597/ormosil was of 12,000. So, in this case, the photostability of the composite glass sample is higher than the ormosil sample. Half life longevity for PM 580/ormosil, PM 580/composite glass and PM 567, in the same kind of measurement were generally between 11,000 and 13,000 pulses, and there was no significant difference between the photostability of the samples, so, further investigation is needed in order to improve the photostability.

Conclusions

Pyrromethene dyes doped in solid matrices based on sol gel process, are very efficient as tunable lasers between 540 and 580 nm. The slope efficiency of these lasers, pumped transversally by the second harmonic generation of Nd:YAG laser, approaches tenths percents.

It will be evident to those skilled in the art that the invention is not limited to the details of the foregoing illustrative examples and figures and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A process for preparing a solid state dye laser in a composite glass matrix, without the use of polymerization initiators, comprising:

a) preparing a porous silica gel;

b) effecting thermal treatment thereof at a temperature of at least 500° C. to produce a silica gel glass of sufficient strength to undergo impregnation with a laser dye solution;

c) impregnating a laser dye dissolved in methylmethacrylate into said silica gel glass in a closed container; and d) effecting heat polymerization of said methylmethacrylate at a temperature of at least 60° C., whereby there is formed a solid state final glass product having pores impregnated with a laser dye and with polymethylmethacrylate.

2. A process according to claim 1, wherein said dye is a pyrromethene dye.

3. A process according to claim 1, wherein said heat polymerization is carried out in a closed container for a period of at least 5 days at a temperature of at least 63° C.

4. A process according to claim 1, wherein in step d there is formed said final solid state glass product having a density of between 1.4 and 1.5 gm/cm$^3$.

5. A process according to claim 1, wherein in step d there is formed said final solid state glass product having a density of about 1.45 gm/cm$^3$.

6. A process according to claim 1, wherein there is formed a final product emitting light pulses at 560–575 nm and having a laser slope efficiency of about 42%.

* * * * *